United States Patent [19]

Krengel et al.

[11] Patent Number: 5,474,227

[45] Date of Patent: Dec. 12, 1995

[54] METHOD OF FORMING SEAMED METAL TUBE

[75] Inventors: Theordore H. Krengel, Flossmoor, Ill.; John J. Borzym, Northville, Mich.; Charles A. Willettes, Stourbridge, England

[73] Assignee: The IDOD Trust, Novi, Mich.

[21] Appl. No.: 232,505

[22] Filed: Apr. 25, 1994

Related U.S. Application Data

[63] Continuation-in-part of Ser. No. 83,078, Jun. 24, 1993, Pat. No. 5,344,062.

[51] Int. Cl.⁶ .......................... B23K 31/02; B23K 101/06
[52] U.S. Cl. .......................... 228/147; 228/17.5; 228/150; 228/231
[58] Field of Search .......................... 228/17.5, 147, 228/150, 214, 219, 231, 250; 427/376.8

[56] References Cited

U.S. PATENT DOCUMENTS

| | | | |
|---|---|---|---|
| 1,848,671 | 3/1932 | Sieven | 228/219 |
| 2,575,381 | 11/1951 | Colby | 228/17.5 |
| 2,792,490 | 5/1957 | Risch et al. | 219/137 R |
| 3,350,771 | 11/1967 | Durst | 228/219 |
| 5,035,042 | 7/1991 | Maitra et al. | 228/147 |

FOREIGN PATENT DOCUMENTS

| | | | |
|---|---|---|---|
| 3630625 | 3/1988 | Germany | 228/219 |

*Primary Examiner*—P. Austin Bradley
*Assistant Examiner*—Jeffrey T. Knapp
*Attorney, Agent, or Firm*—Howard & Howard

[57] ABSTRACT

The method of forming a coated seamed metal tube of this invention is particularly, but not exclusively adapted to existing continuous tube forming mills, wherein the tube is formed from a metal strip and welded with the seam located in an upper portion of the tube. In the process of this invention, at least one surface of the strip is coated with a metal coating prior to forming and welding. The tube is then turned to relocate the welded seam in a lower portion of the tube and the lower portion of the tube is then reheated to melt the metal coating and the metal coating then flows downwardly over and coating the welded seam. In the most preferred continuous or in line process of this invention, the tube is continuously spirally twisted following welding to locate the seam in a lower portion of the tube adjacent a heater and the tube is then heated by the heater to the melting temperature of the metal coating, causing the coating to coat the seam.

14 Claims, 2 Drawing Sheets

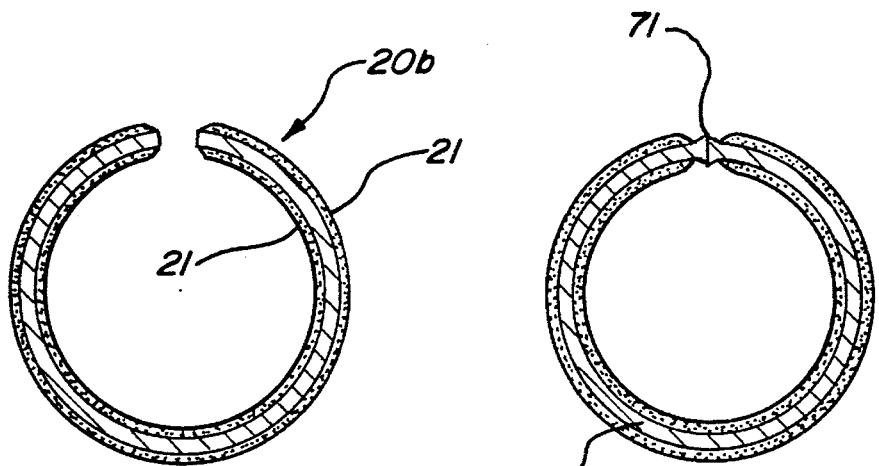
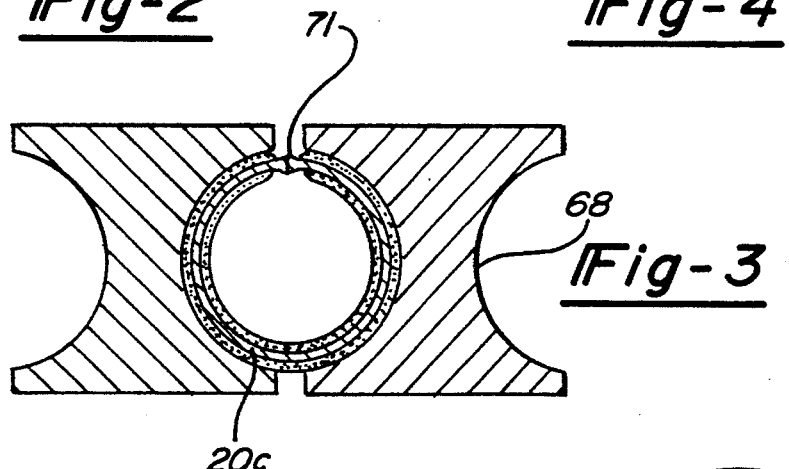
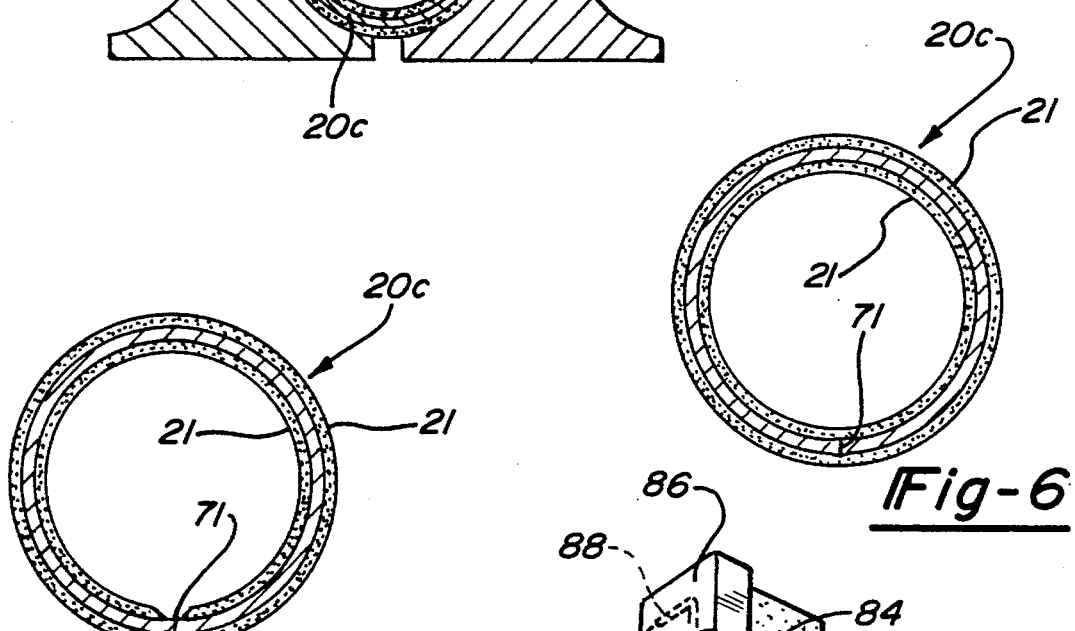
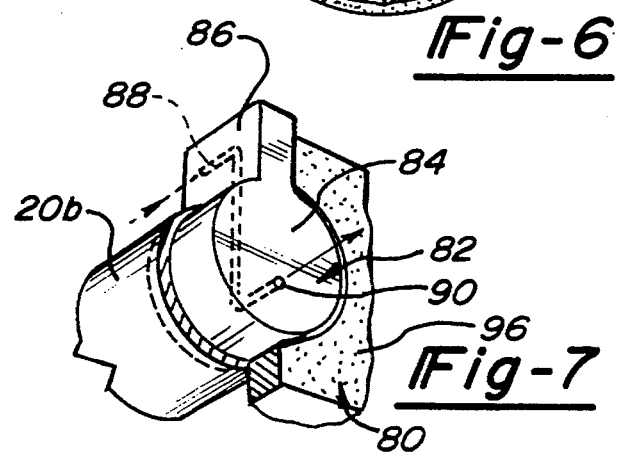

METHOD OF FORMING SEAMED METAL TUBE

This application is a continuation-in-part application of U.S. Ser. No. 08/083,078, filed Jun. 24, 1993, now U.S. Pat. No. 5,344,062.

This invention relates to an improved method of forming a seamed metal tube having a metal coating. More particularly, the present invention relates to a process suitable for continuous or in-line processes for forming ferrous metal tubes coated with a protective metal coating, preferably, zinc, aluminum or copper and their alloys.

BACKGROUND OF THE INVENTION

Methods of continuously or in-line forming of a seamed steel tube from a continuous strip or skelp are well known. In a conventional tube forming mill, the continuous strip is first cleaned and conditioned, then rolled to form an open seam tube having nearly abutting edges at the top of the tube. The edges are then welded together by one of several conventional methods which generally include heating the edges and then either forging the edges together with squeeze rolls and/or flux welding the seam. The edges of the tube may be heated, for example by resistance welding, electric arc or by high frequency induction welding. High frequency induction welding is a form of electric resistance welding, wherein the open seam tube is received through an electric work coil which creates a strong magnetic field, which in turn induces a current to flow around the tube and in the "Vee" formed as the edges of the strip are welded. An impeder is generally located within the tube, which forces the current down the nearly abutting edges of the open seam tube, heating the tube edges to a hot forging temperature. The tube edges are then forged by squeeze rolls which drive the molten edges together to form an integral seam.

In-line galvanizing and coating or painting processes are also well known. The strip or skelp may be galvanized or painted on one or both sides prior to forming and welding, or the welded seamed tube may galvanized by immersing the tube in a molten zinc bath. Where the strip is coated with a protective coating prior to seam welding, the coating will burn off or melt in the seam zone because the welding operation involves the melting of the tube material, which is generally steel. Thus, the temperature at the seam may be 2,300° F., or greater. Where the strip is coated with a metal, such as zinc or aluminum, the metal will melt during welding and flow downwardly away from the seam, which is located at the top of the tube. A zinc coating solution has also been used to paint the exterior surface of the seam. However, such coatings have poor adherence and are mainly cosmetic. The failure of the present processes to fully coat and thus protect the tube seam is evident by the fact that the weld area is generally the first to fail in accelerated corrosion tests. At present, there is no commercial in line process coating the entire internal and external surfaces of a tube with zinc. Thus, there has been a long-felt need to provide an improved coating process, particularly on the seam.

The continuous tube forming process and apparatus of this invention solves the above identified problems and produces a superior metal coated tube. The process of this invention assures a fully coated welded seam without substantial additional costs and may be used with conventional tube forming processes.

SUMMARY OF THE INVENTION

As set forth above, the present invention relates to an improved tube forming and coating process and apparatus. The method of forming a seamed metal tube of this invention is particularly, but not exclusively adapted to a continuous process wherein the strip is coated on one or both surfaces with a metal coating prior to forming and welding. Thus, the method includes first coating one or both surfaces of a metal strip or skelp with a metal coating, preferably a coating of zinc, aluminum, copper or other alloys having a melting temperature substantially below the melting temperature of the tube. For purposes of this disclosure, the coating will generally be referred to as zinc because zinc is the most common protecting coating for ferrous tubes. The process then includes rolling and forming the strip into a tube-shaped strip or open seam tube having opposed spaced nearly abutting lateral edges which may be located in an upper portion of the open seam tube. The process then includes heating and integrally welding the adjacent edges of the strip to form a tube having a welded seam in the upper portion of the tube. The process of this invention may thus be used in a conventional tube mill, wherein the skelp is rolled upwardly and the weld is initially located at or near the top of the tube. The method of this invention may also be used in a spirally welded tube, wherein the tube is reheated when the weld is located at the bottom of the tube. The most preferred method includes inductively heating the opposed lateral edges of the strip by moving the strip continuously through an induction coil with the nearly abutting edges oriented generally upwardly and then forging the edges together with squeeze rolls to form an integrally seamed tube having a welded seam initially oriented upwardly.

The tube is then "turned" to locate the welded seam in the lower portion of the tube. In the most preferred continuous in line process of this invention, the tube is twisted to locate the weld in the lower portion of the tube. The tube may also be twisted to continuously locate the seam in the lower portion of the tube with a spirally welded tube. Where the tube is cut to length before further processing, the tube is rotated to locate the seam in the lower portion of the tube. The method of this invention may then include reheating at least a lower portion of the tube to the melting temperature of the metal coating, such that the molten metal coating flows downwardly and coats the seam. The metal coating on the inner surface of the tube flows downwardly and accumulates over the seam. In a most preferred embodiment, the open seam tube is welded in a substantially inert atmosphere and the seamed tube is reheated in an inert atmosphere to cause the metal coating to flow downwardly over the seam prior to oxidation of the molten seam. This is accomplished in the disclosed embodiment by enclosing the tube welding and reheating apparatus in an enclosure and injecting nitrogen or other inert gas under pressure into the enclosure to maintain an inert atmosphere. Where the tube is eternally coated with a metal coating, the tube seam is preferably scarfed before reheating.

A preferred embodiment of a method of this invention includes coating both surfaces of the strip with zinc, prior to forming. In a most preferred method, the thickness of the metal coating is controlled to form a coating having a thickness which increases from a mid-portion of the strip toward the lateral edges. It will be understood, however, that the edges should be free of coating to permit welding. Thus, the metal coating may be removed from the edges following galvanizing by edge conditioning comprising either slitting the edges or otherwise removing the coating at the edges. Where the thickness of the metal coating increases toward the edges or the coating has sufficient thickness, it may be possible to obtain a reflow of the metal coating over the seam without reheating following welding, particularly where the edges are welded in an inert atmosphere.

In certain applications, it may also be desirable to add molten zinc or zinc powder (where the coating is zinc) to the inside of the tube, which then becomes part of the coating when the coating is melted or remelted. The metal powder or molten metal can be simply inserted or blown into the tube or sprayed onto the welded seam with or without a conventional fluxing agent, which serves as binder and adhesive, downstream of the weld zone. When the tube is turned or twisted, loose metal powder will fall and collect on or adjacent the seam, where it is melted when the coating adjacent the seam is melted, to cover the seam. For the purposes of this disclosure, metal coating powder, if added, will be considered as part of the metal coating.

Other advantages and meritorious features of the continuous tube forming and coating process of this invention will be more fully understood from the following description the preferred embodiments, the claims, and the drawings, a brief description of which follows.

BRIEF DESCRIPTION OF THE DRAWINGS

FIG. 2 is a cross-section view of a tube-shaped strip or open seam tube formed by the process of FIG. 1, in the direction of view arrows 2—2;

FIG. 3 is an end view of the welded tube forming step by squeeze rolls, with the welded seam located at the top of the tube;

FIG. 4 is an end cross-sectional view of the welded tube with the seam located at the top of the tube at 4—4 in FIG. 1;

FIG. 5 is a cross-sectional end view of the welded tube at 5—5 in FIG. 1, with the welded seam located at the bottom of the tube;

FIG. 6 is a partial cross-sectional end view of the seamed tube at 6—6 in FIG. 1 following reflow of the metal coating over the seam; and FIG. 7 is a side elevation partially broken away of a tube entering the seam welding station through an internal seal.

Figure 1:
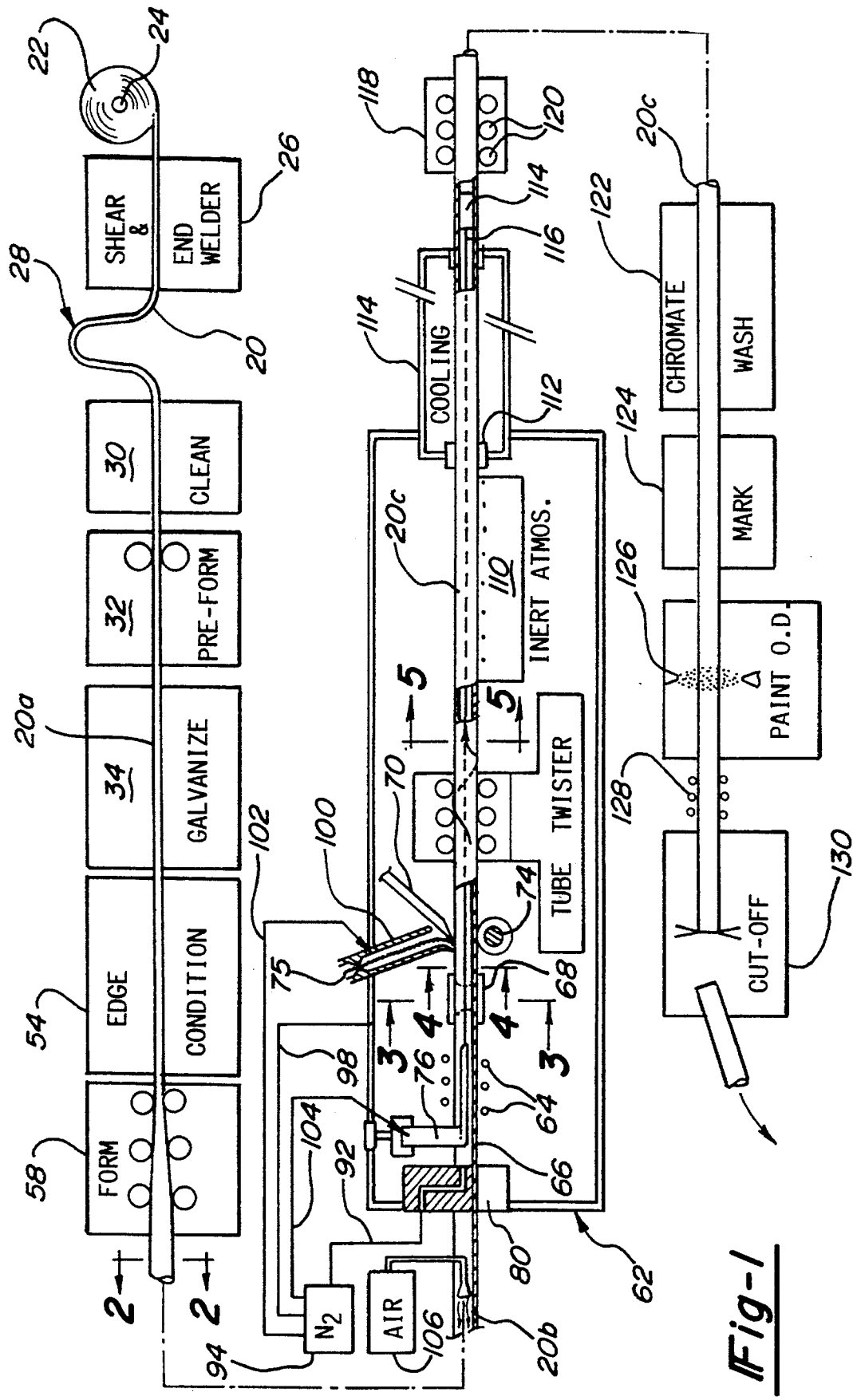
FIG. 1 is a schematic flow diagram illustrating a preferred embodiment of a continuous tube forming and coating process of this invention.

DESCRIPTION OF THE PREFERRED EMBODIMENTS OF THE TUBE FORMING AND COATING PROCESS OF THIS INVENTION

As shown in the schematic flow diagram of FIG. 1 and described above, the tube forming and coating and process of this invention is particularly, but not exclusively adapted for processing of endless lengths of untreated strip steel or skelp, such is normally processed by a continuous tube forming mill. Improvements described herein can also, however, be used with pre-coated strip, wherein a metal coating is applied to one or both surfaces of the strip prior to processing. Further, the improvements described herein can also be used in a batch or non-continuous process. The process of this invention will, however, be described in relation to the continuous process disclosed in FIG. 1.

Metal strip or skelp, preferably strip steel, 20 is supplied to the tube forming mill in coils 22, which are mounted on a pay-out reel 24. The coil is mounted for free rotation on the reel 24 as required by an continuous tube forming mill. As will be understood by those skilled in the art, the strip is processed by the mill substantially continuously at a constant rate. The advancement of the flat strip or skelp 20 through the mill is effected primarily by engagement between the strip and the forming and sizing rolls which rotate at a relatively constant speed. The strip 20 is thus drawn into the mill from the pay-out reel 24.

Because the length of each coil 22 of strip steel is taken up by the mill in a relatively short time, means must be provided for splicing the end of one coil to the next, which is accomplished at the splicing station 26. In the splicing station 26, the end of the coil being processed in the mill is sheared or cut to provide a square end and the end is then welded to the beginning of the next reel. A conventional accumulator 28 in the form of a loop of strip is provided having sufficient length to continuously feed the strip to the mill while the trailing end of the coil is held stationary for shearing and welding. The loop may be formed by feeding the strip over a series of rolls (not shown) which are mounted to freely rotate as is well-known in the art. When the splice is complete, the strip is again paid-out over the accumulator rolls for the next splicing operation when the next reel is exhausted.

Because the coil of skelp is received by the mill normally includes oil and may include other contaminants, it is generally necessary to clean and prepare the strip prior to coating, which in the disclosed process is accomplished at the cleaning station 30. In a typical application, the strip is cleaned and prepared by alternate alkaline and phosphate washes, with intermediate thorough water rinses. In the disclosed process, the strip is also dried. The cleaned strip is now ready for galvanizing.

The strip may be pre-formed if desired in a pre-form station 32 having a plurality of rolls 34 which form the strip into a desired shape, such as an arcuate shape as described, for example, in U.S. Pat. No. 3,696,503 of Krengel et al. The strip is formed by a series of forming rolls which have a configuration and number sufficient to form the strip into the desired shape, including rolls which engage the upper and lower surfaces of the strip. By forming the strip into an arcuate shape, the amount of zinc which will adhere to the surface will be that necessary to obtain a coating that will be strongly bonded to the surface of the strip having a desired thickness, good coverage and a good appearance. For example, where the strip is pre-formed into a downwardly opening arcuate shape, the coating will be thicker adjacent the edges, which is advantageous in the process of this invention. The process of this invention may also be utilized to coat only one side of the strip, wherein the coated surface is preferably located on the inside surface of the tube when formed, as described below. Further, the method or process of this invention may be utilized with precoated strip, wherein one or both surfaces of the strip are coated with a metal coating having a melting temperature substantially lower than the melting temperature of the tube, as described above. Where a pregalvanized strip is utilized, the preconditioning, cleaning and processing of the strip prior to welding should not be required.

The strip 20a may then be advanced through the galvanizing tank 34 and immersed in molten zinc in a convention manner as described, for example, in the above-referenced U.S. Patent of Krengel, et al. Where the strip is preformed into an arcuate shape, as described above, the zinc coating on the arcuately shaped strip flows downwardly toward the lateral edges of the strip, such that the thickness of the zinc coating increases from the mid-portion toward the edges.

In a conventional mill, the strip 20 as received on the reel has a width which is slightly greater than the width required to form the tube, such that an edge is available on each side of the strip for proper sizing of the tube and to provide freshly cut metal at the abutting edges forming the seam. The side edges of the strip will normally be coated with zinc in the galvanizing tank 34. Thus, it is preferable to remove the zinc from the side edges prior to welding, particularly where the edges of the open seam tube are joined by induction welding. A conventional edge shaver or slitter may be used in the edge conditioning station 54, which may be used to cut a square edge. More preferably, a chamfered edge may be provided to provide relief for the forged upset and assure good welding contact between the edges in the welding operation described below. FIG. 2 illustrates the strip following edge conditioning, wherein the zinc coating has been removed from the lateral edges 48 of the arcuate strip and the zinc coating 56 increases in thickness from the midportion toward the lateral edges 48.

The metal strip 20a is then rolled into a tube-shaped strip or open seam tube 20b having adjacent or nearly abutting lateral edges at the forming station 58. The metal strip is progressively formed into an open seam tube as it passes between rolls 60. The rolls are rotatively supported on vertical and horizontal axles (not shown) in a conventional manner. In the continuous tube forming and coating process of this invention, the lateral edges of the strip are deformed or bent upwardly and inwardly toward one another as the tube is formed as in a conventional tube forming mill. The lateral edges of the strip are then rolled into nearly abutting relation at the upper portion of the open seam tube 20b having a metal coating 21 on both sides; however, the adjacent lateral edges are slightly spaced, as shown in FIG. 2. The open seam tube 20b is then received in the tube welding station 62, where the lateral edges of the strip are welded, as now described.

The most preferred embodiment of the tube welding apparatus of this invention utilizes high frequency induction to heat the opposed lateral edges of the open seam tube 20b. As shown in FIGS. 1 and 3, the induction welding apparatus includes a work coil 64 which is connected to a source of high frequency alternating current, not shown. The work coil 64 creates a strong magnetic field, which in turn induces current in the open seam tube adjacent the work coil. An impeder 66 is located within the open seam tube 20b. The impeder 66 includes a support or bracket portion 76 which extends upwardly between the opposed adjacent lateral edges 48 of the open seam tube 20b. A conventional induction welding impeder consists of a non-metallic tube surrounding one or more ferrite rods. Water or mill coolant is circulated over and past the ferrite rods to remove the heat produced by magnetic hysteresis and eddy current losses. At the frequencies used for induction welding (typically 200 to 800 kHz), current flows around the tube and along the "Vee" formed by the approaching edges of the strip, heating the edges to a hot forging temperature, whereby the edges are at least partially melted. As will be understood by those skilled in the art, ferrous tube, usually heavy wall product, is being welded at lower frequencies down to 60 KHz. The lower the frequency, the wider the zone of the tube heated. In the process of this invention, it is preferable to limit the zone heated above the melting temperature of the coating to reduce coating loss, particularly where the seam is initially located at the top of the tube. The edges are then forged together by squeeze rolls 68 as shown in FIG. 3, forming an integral seam 71. Where the strip is steel, the temperature of the edges will be about 2,300° F., or greater. The seamed tube then passes over a scarfing tool 70 which removes the flash 72 from the outer portion of the seam, as shown in FIG. 1. A back-up roller 74 engages the opposed surface of the tube, counteracting the pressure of the scarfing tool 70.

In the most preferred tube welding and coating process of this invention, the edges of the open seamed tube are welded in a substantially inert atmosphere. In the embodiment of the tube welding station 62 shown in FIG. 1, the welding apparatus is enclosed within an enclosure 78. The open seam tube 20b is received in the enclosure through an inert gas seal 80 best shown in FIG. 7. The inert gas seal includes an inner plug 82 which may be formed of a friction resistant thermoset plastic or a ceramic, such as reinforced nylon, which receives the open seam tube 20b, as shown in FIG. 7. The body portion 84 of the plug is generally cylindrical having an outside diameter which is nearly equal to the inside diameter of the open seam tube, to be closely received within the tube. The plug 82 includes a relatively thin radial support portion 86 which is received between the edges of the open seam tube. A gas port extends through the support portion 86 into the plug body portion 84 having an outlet 90 which injects an inert gas, preferably nitrogen, into the open seam tube. Line 92 (see FIG. 1) connects a source of inert gas 94 to the inlet in the support portion 86 of the gas plug. A fiber, ceramic or plastic outer seal 96 closely receives the outer surface of the open seam tube 20b, providing a seal for the open seam tube as it enters the inert atmosphere in the enclosure 78. Nitrogen gas is also injected through line 98 into the enclosure 78 to produce a substantially inert atmosphere in the enclosure. The flash 72 scarfed from the tube is received in a tube 100 which extends out of the enclosure 78. Inert gas is injected into the tube through line 102 to maintain the inert atmosphere in the enclosure 78 as the flash is scarfed from the tube. Inert gas is also injected into the impeder through line 104, which is connected to the bracket 76 of the impeder. In the disclosed embodiment, the tube is dried and cleaned prior to receipt in the inert atmosphere enclosure 78 by an air blower 106 which blasts warm air into the open seam tube 20b. The blower dries the tube and blows small debris out of the tube through the spaced lateral edges 48.

As described above, the metal coating 21 adjacent the opposed lateral edges of the strip will melt or burn off in the weld zone by the forging temperature induced by the work coil 64. Further, the weld seam 71 is relatively rough and therefore difficult to coat. Where the tube is galvanized after welding, the zinc coating will tend to pull away from the seam as the tube emerges from the zinc bath because the seam is normally located at the top of the tube. In the tube welding and coating process of the present invention, the nearly abutting edges 48 are located near the top of the tube when the edges are welded as best shown in FIG. 3. The tube is then "turned" to locate the seam 71 in the lower portion of the tube, such that the zinc melted by the welding process will flow downwardly over the seam, re-coating the seam with molten zinc. Where the thickness of the zinc coating 21 is built up adjacent the seam or where the coating has sufficient thickness, the zinc or other metal coating melted in the welding process may be sufficient to fully re-coat the seam without reheating, depending upon the thickness of the coating, the diameter of the tube and the speed of the line. However, in most applications, it will be necessary to remelt the metal coating to cause the metal coating to flow downwardly over the seam and cover the seam.

In the most preferred in line or continuous process of this invention, the tube 20c is spirally twisted following welding to locate the welded seam 71 in the lower portion of the tube as shown in FIG. 5. The twisting of the tube is accomplished in the disclosed process is initiated by the roller assembly 108, which includes a plurality of rollers. The rollers initiate twisting of the tube, such that the welded seam is located in the lower portion of the tube, preferably near the bottom of the tube when the tube reaches the induction coil 110, as shown in FIGS. 1 and 6. A continuous tube twister of this type is available from MTM Equipment of Spinea, Italy under the trade name "Tube Twister." The rollers of the tube twister introduce tension in the tube to initiate spiral twisting. The spiral twisting device of MTM Equipment was developed to allow manufacturers of shaped (e.g. square) tubes to locate the weld, where desired. In the method of this invention, the twist is adjusted to locate the seam near the bottom of the tube at the induction coil 110. The required distance between the spiral twist roller assembly 108 and the induction heater 110 will depend upon the diameter of the tube and the speed of the line. For example, a standard tube having an outside diameter of 2 and ⅜ inches may be spirally twisted to relocate the welded seam from the top of the tube to the bottom of the tube in about 30 to 35 feet.

In the preferred process of this invention, the tube is then reheated to a temperature above the melting temperature of the metal coating and the coating then flows downwardly to coat the seam. In the disclosed embodiment of the process of this invention an induction coil 110 is located opposite the lower portion of the tube which heats the lower portion of the tube 20c melting the metal coating. Because the seam is now located in the lower portion of the tube, the molten zinc or other metal coating flows downwardly, over the inner and outer surfaces of the seam and collects at the bottom of the tube, coating the seam 70 with a protective zinc coating as shown in FIG. 6. Where both the inner and outer surfaces of the tube are coated, as shown, the induction coil 110 is preferably located within enclosure 62, such that the tube is maintained within an inert atmosphere during reheating, to avoid oxidation of the outside surface of the weld, prior to coating the weld. As will be understood, the seam 71 may be preferably located near the bottom of the tube, particularly where only the internal surface of the tube is coated, such that the metal coating 21 "puddles" over the weld. However, the seam may be located anywhere in the lower half of the tube, provided the induction coil 110 is located adjacent the seam. More preferably, the seam is located in the lower third portion of the tube. Where the seam is spaced from the bottom of the tube, the molten metal coating will flow over the seam, which is advantageous, particularly for coating the exterior surface of the seam. The seamed tube 20c then exits the inert atmosphere chamber 78 through seal 112.

The tube is then cooled by immersing the tube in cold water or other coolant in the cooling chamber 114, freezing the metal coating on the tube. Inert gas is prevented from escaping the tube in the welding apparatus 62 by a cylindrical plug 114 which may be attached to the end of the impeder by a tether 116. The plug 114 may be made of a friction resistant thermoset plastic, such as nylon, and is preferably located sufficiently downstream from the conduction coil 110 and following cooling to avoid damage to the plug.

Following cooling, the tube 20c enters the final sizing station 118 which includes a plurality of sizing and straightening rolls 120. Thereafter, the tube is flooded with an aqueous chromate solution and rinsed at 122, which chemically etches and seals the zinc coating prior to final finishing. In a conventional tube mill, the tube is then marked at 124 with product identification and further markings as may be specified by the customer. A clear lacquer coat or other protective coating may then be applied in the OD paint station 126. An induction heating coil 128 may then be used to dry the tube and the tube is finally cut to length at the cutoff station 130.

As will now be understood, the method of forming seamed metal tube of this invention may be utilized in a conventional continuous tube forming mill, wherein the tube is formed by conventional rollers into an open seam tube having nearly abutting lateral edges located at the upper portion of the tube and the tube may then be welded with the weld seam located at or near the top of the tube. Where the exterior surface of the open seam tube is coated, as shown, the tube is preferably welded and "reheated" in an inert atmosphere; however, where only the internal surface of the tube is coated, the exterior surface need not be maintained in an inert atmosphere. The exterior surface of the tube may then be coated with zinc, for example, in a conventional zinc coating bath located downstream of the induction coil 110. Other modifications may also be made to the process of this invention within the purview of the appended claims. For example, as described above, the process of this invention may be utilized in a batch-type process, wherein the tube is cut to length following welding and the tube sections are then rotated to locate the seam in the bottom of the tube, prior to heating at least the lower portion of the tube to melt the metal coating and cause the molten metal coating to flow over the seam. Further, the method of this invention may be utilized for coating the seam of tubes having special cross sections, including square and rectangular tubes. The tube may also be reheated by heating means other than induction heaters, such as radiant heaters. The tube may also be welded by other conventional means including, for example, resistance or flux welding or laser heating. Finally, the method of this invention may be used with precoated strip in either a continuous or batch-type process.

Having described the process of this invention, we now claim the invention, as follows:

1. A method of forming a seamed metal tube having a metal coating from a metal strip, comprising the following steps, performed in sequence:

a) coating at least one surface of said strip with a metal coating having a melting temperature substantially below the melting temperature of said strip;

b) forming said strip into a tube-shaped strip having opposed adjacent spaced lateral edges and said coating on an inner surface of said tube-shaped strip;

c) heating and integrally welding said adjacent edges of said strip to form a tube having a welded seam and locating said welded seam in a lower portion of said tube; and d) reheating at least said lower portion of said tube to the melting temperature of said coating, said coating then flowing downwardly over and coating said seam.

2. The method of forming a coated seamed tube as defined in claim 1, wherein said method includes heating and integrally welding said adjacent edges of said tube-shaped strip to form a tube having a welded seam located in an upper portion of said tube, then turning said tube to relocate said seam in a lower portion of said tube, prior to reheating said tube.

3. The method of forming a coated seamed tube as defined in claim 2, wherein said method is a continuous in-line process, said method including continuously spirally twisting said tube to relocate said welded seam in said lower portion of said tube, then heating at least a lower portion of said tube to melt said coating to flow over said welded seam.

4. The method of forming a coated seamed tube as defined in claim 3, wherein said method includes initiating a spiral twist in said tube following welding, said tube continuing to spirally twist to locate said welded seam in said lower portion of said tube adjacent a heater, then heating said lower portion of said tube with said heater to melt said coating.

5. The method of forming a coated seamed tube as defined in claim 3, wherein said method includes coating both surfaces of said strip with a metal coating, then welding said tube, spirally twisting said tube and heating said lower portion of said tube in a substantially inert atmosphere.

6. The method of forming a coated seamed tube as defined in claim 5, wherein said method includes passing said tube through an enclosure prior to welding, introducing an inert gas under pressure into said enclosure and maintaining said substantially inert atmosphere within said enclosure, and performing said steps of welding, spirally twisting and reheating said tube within said enclosure in said substantially inert atmosphere.

7. A method of forming a seamed metal tube having a metal coating from a metal strip, comprising the following steps performed in sequence:
 a) coating at least one surface of said strip with a metal coating having a melting temperature substantially below the melting temperature of said strip;
 b) forming said strip into a tube-shaped strip having opposed adjacent spaced lateral edges in an upper portion of said tube-shaped strip;
 c) heating and integrally welding said adjacent edges of said strip to form a tube having a welded seam in said upper portion of said tube;
 d) turning said tube to relocate said welded seam in a lower portion of said tube; and
 e) reheating at least said lower portion of said tube to the melting temperature of said metal coating, said metal coating then flowing downwardly over and coating said seam.

8. The method of forming a coated seamed metal tube as defined in claim 7, wherein said method is a continuous in line process, said method including continuously spirally twisting said tube to relocate said welded seam in said lower portion of said tube, then reheating at least said lower portion of said tube to the melting temperature of said metal coating.

9. The method of forming a coated seamed tube as defined in claim 8, wherein said method includes initiating a spiral twist in said tube by rolling said tube spirally following welding, said tube then continuing to spirally twist to locate said welded seam in said lower portion of said tube over a heater, then heating said lower portion of said tube with said heater to melt said coating.

10. The method of forming a coated seamed tube as defined in claim 7, wherein said method includes coating both surfaces of said strip with said metal coating, then welding said tube and reheating said tube in a substantially inert atmosphere.

11. The method of forming a coated seamed tube as defined in claim 10, wherein said method includes passing said tube, prior to welding, through an enclosure, introducing an inert gas under pressure into said enclosure and maintaining said substantially inert atmosphere within said enclosure, and performing said steps of welding said adjacent edges of said strip to form a tube, turning said tube and reheating said lower portion of said tube within said enclosure.

12. A method of forming a seamed metal tube having a metal coating from a continuously moving metal strip, comprising the following steps performed in sequence:
 a) coating at least one surface of said strip with a metal coating having a melting temperature substantially below the melting temperature of said strip;
 b) forming said strip into a tube-shaped strip having opposed adjacent lateral edges in an upper portion of said tube-shaped strip;
 c) heating and integrally welding said adjacent edges of said strip to form a tube having a welded seam in said upper portion of said tube;
 d) spirally twisting said tube to locate said welded seam in a lower portion of said tube; and
 e) reheating at least said lower portion of said tube to the melting temperature of said metal coating, said metal coating then flowing downwardly over and coating said seam.

13. The method of forming a coated seamed metal tube as defined in claim 12, wherein said method includes coating both surfaces of said strip with said metal coating, and welding said tube, spirally twisting said tube and reheating said tube in a substantially inert atmosphere.

14. The method of forming a coated seamed metal tube as defined in claim 12, wherein said method includes initiating a spiral twist in said tube following welding in a roller assembly, said tube then continuing to spirally twist to locate said welded seam in said lower portion of said tube adjacent a heater, then heating said lower portion of said tube with said heater to melt said coating.

* * * * *